Dec. 14, 1971   D. B. LEVINS   3,626,752

FUEL MANAGEMENT SYSTEM

Filed May 27, 1968   2 Sheets-Sheet 1

INVENTOR
DAVE B. LEVINS
BY Frank L. Neuhauser
ATTORNEY

Dec. 14, 1971  D. B. LEVINS  3,626,752

FUEL MANAGEMENT SYSTEM

Filed May 27, 1968  2 Sheets-Sheet 2

INVENTOR
DAVE B. LEVINS

BY *Frank L. Neuhauser*

ATTORNEY

United States Patent Office 3,626,752
Patented Dec. 14, 1971

3,626,752
FUEL MANAGEMENT SYSTEM
Dave B. Levins, Swampscott, Mass., assignor to
General Electric Company
Continuation of application Ser. No. 528,584, Feb. 18,
1966. This application May 27, 1968, Ser. No. 739,973
Int. Cl. G01m 1/12
U.S. Cl. 73—65                                              7 Claims

ABSTRACT OF THE DISCLOSURE

A fuel management system for indicating aircraft center of gravity. Fuel probes in each fuel tank produce an electrical signal which varies in accordance with the fuel level at each proble. This signal is converted by scaling resistors to produce a liquid weight current signal and a liquid weight moment signal. Servo means and amplifiers are energized by these two current signals to obtain the total aircraft liquid weight and moment and to indicate the aircraft center of gravity.

This application is a continuation of application Ser. No. 528,584, filed Feb. 18, 1966, now abandoned.

BACKGROUND OF THE INVENTION

This invention is generally directed to a fuel management system and more specifically to a fuel management system for a vehicle wherein the fuel weight and the vehicle center of gravity are monitored.

Fuel systems are characterized by a consumable mass which causes a change in the center of gravity of the vehicle which uses the fuel. This change in fuel weight and the resultant change in vehicle center of gravity can become critical in applications wherein stable vehicle operation can be adversely affected by such changes. For example, in high performance aircraft it is desirable to maintain the position of the center of gravity close to the center of pressure for a given operating mode to stabilize the aircraft. As fuel is consumed during vehicle operation from the usual plurality of fuel tanks associated with the vehicle, the center of gravity is shifted. However, as the tanks empty and space becomes available therein, the remaining fuel can be shifted among the tanks to shift the center of gravity; and in many cases means are provided to accomplish this fuel shift. To be effective, this fuel must be shifted intelligently so an accurate indication of the vehicle center of gravity is needed. Furthermore, the individual fuel tank and total fuel tank quantities must also be accurately indicated in order to aid in the fuel transfer.

Therefore, it is an object of this invention to provide a fuel management system which automatically indicates both the fuel quantity and the center of gravity of a vehicle.

There have been several attempts in the prior art to obtain both these measurements, but each has several disadvantages when applied to vehicles such as the high performance aircraft of today. In some of the prior art systems, mechanical linkage has been provided between a float in the tank and external electrical devices to vary these electrical devices. If this mechanical linkage is subjected to the forces of vibration, the linkage can wear and thereby decrease the reliability of the fuel level indication. In addition, mechanical linkage has normally been extended from internal portions of the fuel tank to external portions thereof thereby necessitating the use of imperforate seals through which motion can be transferred. This can also result in expensive sealing and eventually in a loss of reliability.

Another object of this invention is to provide an electrical fuel management system wherein mechanical linkage is substantially eliminated so that reliability of the system is increased and sealing problems are decreased.

Still another disadvantageous feature of the prior art systems has been the use of series potentiometers to give total weights in each tank and another plurality of potentiometers connected in series to give the moment of each tank. This means that the two potentiometers are required to provide each indication of fuel weight and fuel tank moment, and this can result in a loss of reliability in terms of wear of the potentiometers.

Still another object of this invention is to provide a fuel management system wherein a greater reliability is achieved by reducing the number of components required.

Some of the prior art systems have utilized a weight signal and a moment signal to energize each of two meters. The center of gravity indication was then obtained by aircraft personnel who compared the two meter readings and utilized charts to determine the location of the center of gravity. However, this is disadvantageous as, in many aircraft, personnel cannot take the time to perform this calculation even with mechanical aids.

Therefore, it is still another object of this invention to provide a fuel management system which constantly provides indications of the fuel weight and of the center of gravity without the requirement of additional calculation by aircraft personnel.

In other prior art systems separate capacitive fuel level probes have been used to provide the weight and center of gravity indications. Even with other systems in which noncapacitive fuel level probes have been used, there has been a requirement to use two variable signal producing means when two signals are required.

Another object of this invention is to provide a fuel management system wherein both the center of gravity and the fuel weight signals are obtained from a single probe to thereby reduce the number of and weight of the components and increase the reliability of the system.

SUMMARY

Briefly stated, this invention is particularly adapted for operation in a vehicle having a plurality of fuel tanks wherein a probe is disposed in each tank to provide a voltage signal indicative of the fuel level. Means are connected to the probe for converting the fuel level voltage signal into a fuel tank weight current signal and a fuel tank weight moment current signal. The fuel tank weight current signals from each tank are then summed to provide a total fuel weight voltage signal. These summed fuel weight current signals are also summed with a dry vehicle weight current signal to provide a total vehicle weight voltage signal. The tank moment current signals are also summed with a dry vehicle moment current signal to provide a total vehicle moment voltage signal. This total vehicle voltage moment signal is then divided by the total vehicle weight voltage signal to provide an indication of the center of gravity position with respect to a datum point on the vehicle.

This invention is particularly pointed out in the appended claims. A more thorough appreciation of the invention, together with additional advantages, features, and objects thereof, can be better understood by reference to the following description taken in conjunction with the drawings:

DESCRIPTION OF AN ILLUSTRATIVE EMBODIMENT

Figure 1:
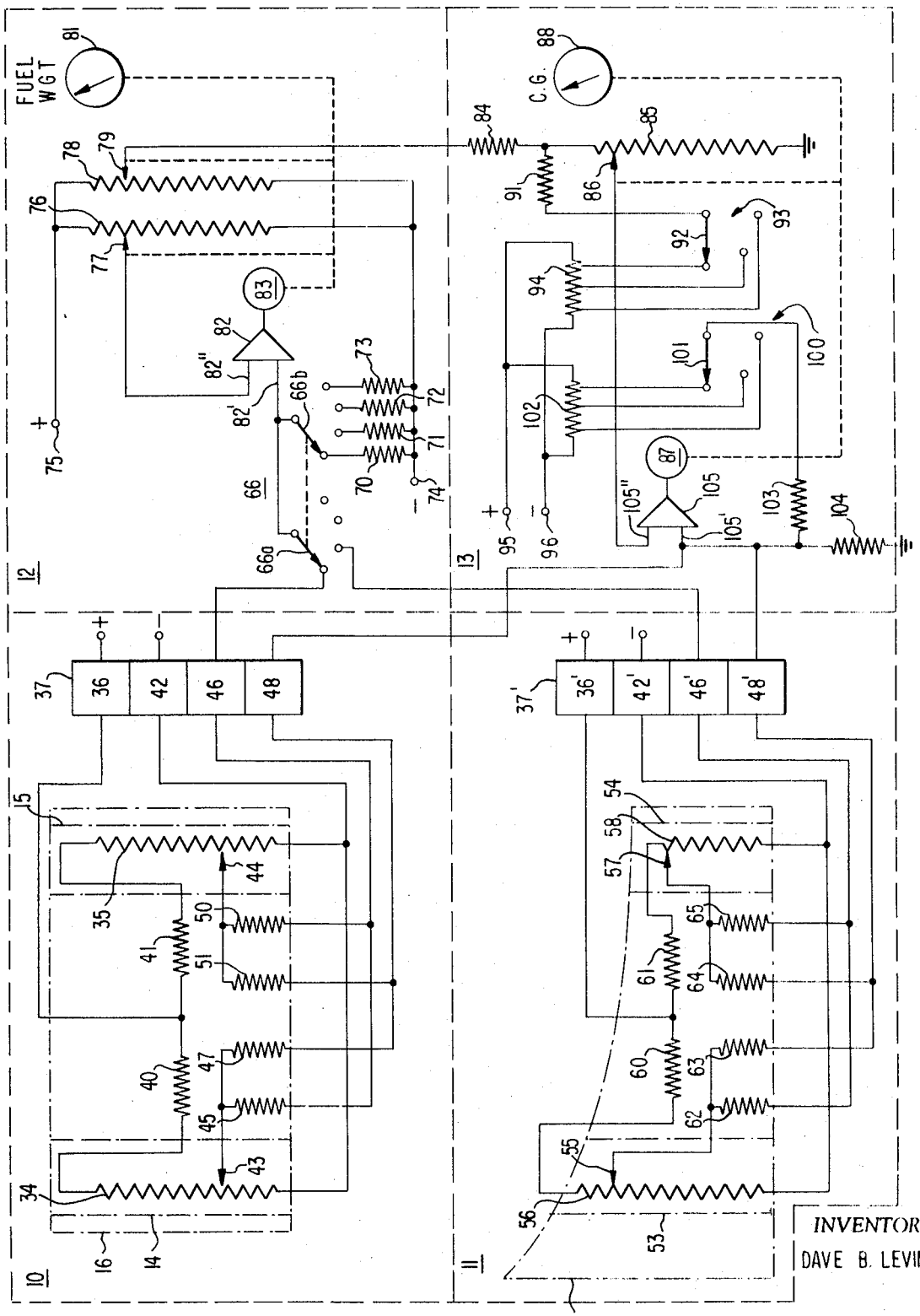
FIG. 1 illustrates a fuel management system as embodies this invention.

Referring to FIG. 1, the fuel management system is revealed therein as comprising four basic circuits: a first tank probe circuit 10, a second tank probe circuit 11, a fuel weight summing circuit and indicator 12 and a vehicle moment summing circuit and center of gravity indicator 13. Each circuit will be described individually with reference to both its structure and its operation, and then the overall operation of the system will be indicated.

The first fuel tank probe circuit 10 comprises a first fuel tank probe 14 and a second fuel tank probe 15 disposed in what is shown in outline form as being a fuel tank 16 of rectangular cross section. Any number of probes can be utilized depending upon the accuracy of the fuel weight and moment indications which are required.

Figure 2:
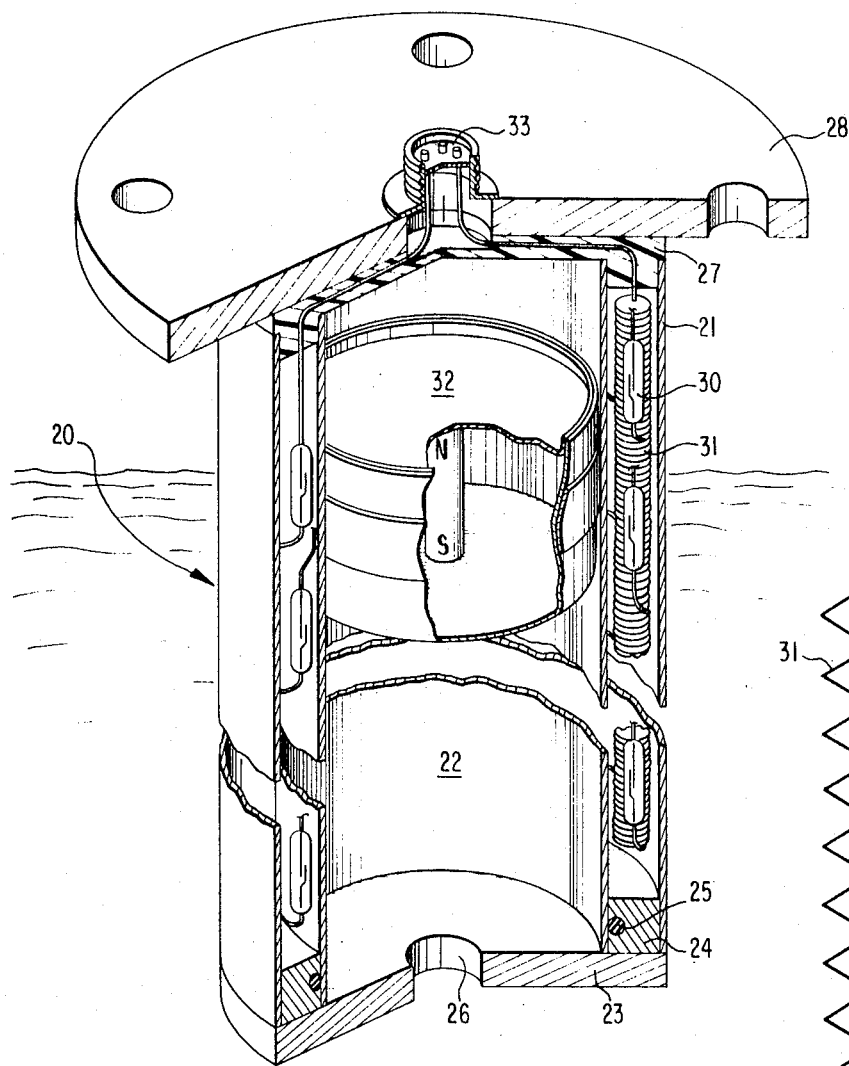
FIG. 2 illustrates a probe which can be utilized with this invention.
Figure 3:
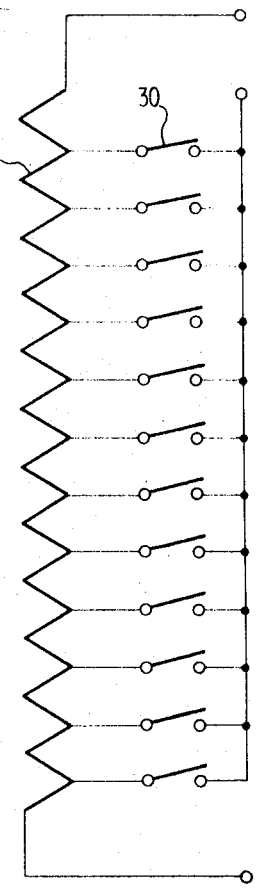
FIG. 3 schematically illustrates the probe shown in FIG. 2.

A detailed illustration of a fuel tank probe suitable for use in this system is shown in FIGS. 2 and 3, and it constitutes an embodiment of a fuel tank probe described in greater detail in Pat. 3,200,645, for "Electric Position Sensor," issued Aug. 17, 1965 and assigned to the same assignee. In this embodiment, the fuel tank probe 20 comprises two spaced concentric cylinders 21 and 22 which are terminated with a bottom wall 23, an annular sealing member 24 and an O-ring 25; an aperture 26 is formed through bottom wall 23 to admit fuel into the probe. A top sealing wall 27 and cover plate 28 are used to hold the device in place and suspend it from the fuel tank walls. A plurality of magnetic reed switches 30 are disposed in the annular chamber defined between walls 21 and 22 in a helical fashion throughout the annular chamber. These reed switches serve to tap a resistance card 31 as a function of the liquid level within the tank probe 20 by means of a magnetic float 32 which closes individual magnetic reed switches as the float level changes to thereby provide an electrical indication of the liquid level in the tank.

For the sake of simplicity and clarity, both the tank probes 14 and 15 in first tank probe circuit 10 have been shown as potentiometers 34 and 35, respectively. One side of potentiometer 34 is connected to a positive terminal 36 of a terminal block 37 by means of a temperature compensating resistor 40 which is immersed in the fuel; similarly, another temperautre compensating resistor 41 connects one side of potentiometer 35 to positive terminal 36. It is assumed for purposes of this discussion that terminal 36 is connected to the positive side of a power supply, which is not shown, but which is well known in the art. The negative side of the power supply is then connected to the other sides of both potentiometer 34 and potentiometer 35 by means of a negative terminal 42.

As the level of the fuel in tank 16 varies, the position of a tap 43, representing the reed switches 30, on potentiometer 34 and a tap 44 on potentiometer 35 vary. Both potentiometers 34 and 35 are equal so that in tank 16 a voltage would appear at taps 43 and 44 which would be dependent upon the fuel volume in terms of a percentage of the permissible fuel volume in the tank if the temperature compensating resistors 40 and 41 were not used. Additionally, if the attitude of tank 16 were changed, then for a given fuel volume before the change the output voltage from one potentiometer would decrease while the other would increase so that the net output voltage would still indicate substantially the same fuel volume.

By adding the temperature compensating resistors 40 and 41 in electrical series with potentiometers 34 and 35 and by disposing them in the fuel, the voltage signals at taps 43 and 44 are modified by fuel temperature changes so that the voltage signal at the taps 43 and 44 represents a percentage of maximum fuel weight for the tank. A scaling resistor 45 connects tap 43 to a fuel weight terminal 46 while another scaling resistor 47 connects tap 43 to a fuel moment terminal 48. Scaling resistors 50 and 51 connect tap 44 to fuel weight terminal 46 and fuel moment terminal 48, respectively.

These scaling resistors 45, 47, 50, and 51 are empirically chosen to be inversely proportional to the weight and moment of the quantity of fuel in the tank at any given level. Therefore, resistors 45 and 50 convert the percent total fuel weight signals to signals indicating the weight of the fuel in the tank while resistors 47 and 51 convert the percent total fuel weight signals to signals indicating the fuel moment about a fixed datum point. As resistors 45 and 50 are connected together, a current signal is coupled through terminal 46 to fuel weight summing circuit and indicator 12 which is indicative of the total fuel weight in tank 16 while the current signal through terminal 48 coupled to the vehicle moment summing circuit and indicated 13 is indicative of the total moment of the tank 16.

Second tank probe circuit 11 is similar to first tank probe circuit 10 but is arranged to measure the fuel in an irregular tank 52. Here it will be noted that a fuel tank probe 53 and a fuel tank probe 54 of different heights are used in the tank. Both potentiometers 56 and 58 are equal in resistance; when the tank 52 is full, the voltages at taps 55 and 57 are equal even though they represent different fuel weights. Both potentiometers 56 and 58 are connected in parallel to a positive terminal 36' and a negative terminal 42' of a terminal block 37' by temperature compensating resistors 60 and 61. The level of the fuel in the tank is indicated by the float level or the position of the taps 55 and 57. The signal at tap 55 is scaled to a true weight current signal by a resistor 62 and to a true moment current signal by a scaling resistor 63 with scaling resistor 62 being connected to fuel weight terminal 46' and scaling resistor 63 being connected to fuel moment terminal 48'. Similarly, scaling resistors 64 and 65 produce true weight and moment current signals which are coupled to fuel weight terminal 46' and fuel moment terminal 48'. As was true with first tank probe unit circuit 10, the fuel weight current signal at terminal 46' is coupled to fuel weight summing circuit and indicator 12 while the fuel tank moment current signal at terminal 48' is coupled to vehicle moment summing circuit and indicator 13.

In order to provide an indication of the weight of fuel in each tank or the total weight of the fuel in all of the tanks in the vehicle, there is provided switching means designated in FIG. 1 comprising a two-pole four-position switch 66 having a switch wafer 66a and a switch wafer 66b. Fuel weight terminals 46 and 46' are connected to two terminals on wafer 66a with a third terminal being internally wired so that when the switch is in the third position the currents from terminals 46 and 46' are combined; when switch 66 is in the fourth position, a test position is obtained. It will be obvious that the number of switch positions is dependent on the number of tanks in the vehicle; further, it will be obvious from additional discussion that the switch 66 can be eliminated if only a total fuel weight indication is necessary. A plurality of resistors 70, 71, 72, and 73 are connected from the terminals of stationary contacts of the switch wafer 66b to a terminal 74 which is connected to the negative terminal of the power supply. These resistors also act as scaling resistors to convert the fuel weight current signals to voltage signals to produce an accurate weight indication on a common fuel weight indicator for different positions of switch 66.

Connected in parallel between the negative terminal 74 and a positive terminal 75 are two potentiometers with a balancing potentiometer 76 having a slide 77 and an output potentiometer 78 having a slide 79. Both slides 77 and 79 and an indicating or readout means 81 are controlled by a servomechanism comprising a servo amplifier 82 and a servomotor 83 coupled to both slides 77 and 79 and the indicating means 81 as shown by the dotted lines. The signals on the switch 66 are coupled to amplifier input 82′ as a total fuel weight voltage signal where they are compared with a signal taken from potentiometer 76 by slide 77 and applied to a second amplifier input 82″. When the voltage from switch 66 differs from that fed back to input 82″, the resultant difference voltage is amplified by servo amplifier 82 to drive the servomotor 83 until the signal from balance potentiometer 76 is the same as that from switch 66. Movement of the motor additionally changes the position of slide 79 and the indicating means 81 so that an accurate output reading is obtained. The output potentiometer 78 provides an isolated voltage signal representative of fuel weight which is coupled to the vehicle moment circuit 13 through the slide 79.

The current signal indicative of the total fuel weight is coupled to vehicle moment summing circuit and indicator 13 by means of a scaling resistor 84 and a potentiometer 85 connected in series between slide 79 and ground. Potentiometer 85 includes a slide 86 the position of which is controlled by a servomotor 87 which additionally controls an indicator 88. Indicator 88 provides an indication of the position of the center of gravity with reference to a datum point when switch 66 is in the third position wherein total fuel weight is indicated by the fuel weight indicator 81.

Also fed through potentiometer 85 is a signal proportional to the total weight of a dry vehicle; that is, the weight of a vehicle without fuel but with various stable loads. This signal is provided by means of a scaling resistor 91 connected between the junction formed by scaling resistor 84 and potentiometer 85 and the movable arm 92 of a switch 93. Switch 93 has a plurality of stationary contacts which are individually connected to a tapped resistor 94 connected across terminals 95 and 96 energized by the power supply. Switch 93 thereby provides a plurality of weight signals which can be used to indicate the weights of the vehicle under varying conditions. As shown, only three modes of operating weights have been shown for the dry vehicle, but additional modes could be added merely by increasing the number of stationary terminals in switch 93 and taps on resistor 94. Therefore, the current through potentiometer 85 varies as the weight of the fuel in the tanks varies according to the position of potentiometer slide 79 and according to the mode of operation as set by switch 93 and represents a total weight of the vehicle including its fuel.

A similar switch 100 includes a movable arm 101, which contacts various terminals and is independently connected to a tapped resistor 102 connected across terminals 95 and 96. The movable arm 101 is then connected through a scaling resistor 103 to a junction formed by conductors from first tank moment terminal 48, second tank moment terminal 48′, and a resistor 104 connected between the junction and ground. Switch 101 in conjunction with tapped resistor 102 provides a fixed vehicle moment current signal which varies according to the mode of operation in a manner similar to that described with reference to switch 93. In fact, switch 100 and switch 93 can be ganged together to provide a single mode switch performing two mode switching functions.

The three moment currents are added by resistor 104 to provide one total moment voltage input signal to an input terminal 105′ of a servo amplifier 105. Another signal to another input terminal 105″ of servo amplifier 105 is taken from slide 86, and the output of amplifier 105 controls servomotor 87. Therefore, if there is a change in the fuel tank moment, a different signal appears at the input 105′ of amplifier 105 and thereby drives servomotor 87 in a direction so as to move slide 86 to null the error. At the same time the center of gravity indicator 88 is also moved as it is also coupled to servomotor 87.

Indicator 88 can be calibrated in feet from a fixed or datum point on the vehicle so that indicator 88 reads the position of the center of gravity in terms of distance from the datum point directly. The division of the total moment provided by conductors from terminals 48, 48′, and switch 100 is accomplished by means of the servo system controlling the position of slide 86 so that the center of gravity distance from the datum point is a function of the position or amount of movement of slide 86.

Several modifications of this circuit are available. For example, if center of gravity readings were not required, circuit 13 and the associated components with tank probes 10 and 11 could be eliminated. If only fuel level indications were required, the temperature compensating resistors could also be eliminated. Furthermore, it may not be necessary in all applications to use a pair of tank probes such as tank probes 14 and 15 in fuel tank 16. In effect, the number of tank probes is a function of the required accuracy of the system, especiallly when an irregular tank such as indicated and outlined by tank 52 of tank probe circuit 11 is used.

In addition to indicator 88, it will be obvious to those skilled in the art that certain additions to the circuit could be made whereby the center of gravity indication additionally controls servo means to cause automatic fuel shifts from tank to tank in order to maintain the center of gravity at a proper location. Such a circuit could be used to switch the tank in use between the various tanks to also control the position of the center of gravity. In still another adaption of the center of gravity circuit 13, signals may be used to operate the trim control apparatus to thereby automatically adjust trim as the center of gravity shifts.

Briefly summarizing, this invention is adapted to be used in any system where the center of gravity of a vehicle must be analyzed. Means are provided for producing a weight signal and a moment signal for each body of fuel, and means are also provided for summing the weight currents and the moment currents to provide total fuel weight and total vehicle moment current signals. Means are also then provided to compare the total vehicle weight and the total moment and to effectively divide the total moment by the total weight to produce an output signal indicative of the position of the center of gravity about a particular datum point.

While the above-cited variations and other embodiments will be obvious to those skilled in the art, the following claims are intended to cover the true spirit and scope of the invention to include all such obvious variations and embodiments.

What is claimed as new and desired to be secured by Letters Patent of the United States is:

1. A system for indicating the position of the center of gravity of a vehicle having fuel disposed in a plurality of tanks about a fixed datum point for indicating the quantity of fuel in the tanks, said system being adapted for energization by a power supply and comprising:

(a) a plurality of fuel level probes in each tank, each including first and second resistive means adapted for series energization by the power supply each said second resistive means being disposed to measure the fuel quantity in the tank, each of said first resistive means producing an output voltage variable as a function of the fuel weight expressed as a percentage of the tank capacity for that measured fuel quantity;

(b) a plurality of third resistive means, each of said third resistive means being connected to one of said first resistive means for converting the percent capacity voltage signal therefor to a first unidirectional current signal proportional to the weight of the measured fuel quantity, the outputs of said third means for each tank being connected together to produce a unidirectional signal proportional to the average of the weights in said tanks;

(c) a plurality of fourth resistive means, each of said fourth resistive means being connected to one of said first resistive means for converting the percent capacity voltage signal therefrom to a second current signal proportional to the moment of the measured fuel quantity about the datum point;

(d) first current summing means connected to said plurality of third resistive means for summing the fuel weight current signals to produce a total fuel weight signal;

(e) means for producing currents proportional to the moment and the weight of the vehicle and tanks;

(f) second current summing means for summing all moment current signals to produce a total vehicle moment signal;

(g) servo means connected to said first and second summing means and said current producing means and responsive to the total fuel weight and vehicle-and-tank weight current signal to produce a total vehicle weight for dividing said total vehicle moment signal by said total vehicle weight signal to indicate the center of gravity position; and (h) indicator means responsive to said first current summing means and said servo means for displaying the vehicle center of gravity position with respect to the datum point and the total fuel weight.

2. A center of gravity position and indicating fuel quantity system as recited in claim 1 wherein said first resistive means includes a resistor having a plurality of taps thereon and a resistance varying means and said second resistive means includes a density compensating means in series with said tapped resistor.

3. A center of gravity position and fuel quantity indicating system as recited in claim 2 wherein said resistance varying means includes a plurality of magnetically actuated switches individually connected between a common terminal and one of said taps and a magnetic field producing means disposed in said fuel for selectively actuating said magnetic switches as a function of liquid level whereby the percent capacity voltage appears at said common conductor.

4. A center of gravity position and fuel quantity indicating system as recited in claim 1 wherein said current producing means is constituted by:
(i) first and second resistors adapted for parallel connection across the power supply, each of said resistors producing a variable output; and
(ii) switching means for selectively varying and coupling each of the outputs to said second current summing means and said servo means.

5. A center of gravity position and fuel quantity indicating system as recited in claim 1 wherein said servo means includes:
(i) first servo-operated means connected to said first current summing means and being energized in response to the fuel weight current signals to indicate total fuel weight on said indicator means; and
(ii) second servo-operated means connected to said second current summing means and said current producing means and energized by the total moment signal and the total vehicle weight signal for coupling to said indicator means an indication of the center of gravity position for the vehicle with reference to the datum point.

6. A center of gravity position and fuel quantity indicating system as recited in claim 5 wherein:
(a) said first servo-operated means is constituted by
(i) a first servo amplifier having first and second inputs and an output, said first input being connected to said first current summing means to obtain a signal therefrom,
(ii) a first servomotor energized in response to the output of said first servo amplifier,
(iii) means responsive to said first servomotor for coupling a total fuel weight indication to said indicator means, and
(iv) a first servomotor position indicating means, said first servomotor position indicating means including feedback signal producing means connected to said second input of said first servo amplifier; and (b) said second servo-operated means includes
(i) a second servo amplifier having a first and second input and an output, said first input of said second servo amplifier being connected to said second current summing means,
(ii) second servo-operated means connected to said servo amplifier output,
(iii) means responsive to said second servomotor for coupling the center of gravity position to said indicator means, and
(iv) a second servomotor position indicating means coupled to said second servomotor, said second servomotor position indicating means being connected to said current producing means and said first servomotor position indicating means to be energized by the total vehicle weight signal, the signal from said second servomotor position indicating means being connected to said second input of said second servo amplifier.

7. A system for indicating the position of the center of gravity of an aircraft with respect to a fixed datum point, the aircraft having a plurality of fuel tanks, and for indicating the weight of fuel in each tank and the total fuel weight adapted to be energized by a power supply means having first and second power supply terminals, said system comprising:

(a) a plurality of fuel level probes disposed in each of the tanks, each of said probes including
(i) first, second, and third probe terminals, said first probe terminal being connected to the first power supply terminal,
(ii) a resistor connected between said first and second probe terminals, said resistor having a plurality of taps thereon,
(iii) a plurality of magnetically actuated switches, each of said switches connected to one of said resistor taps and said third probe terminal, and
(iv) magnetic float means disposed in the fuel to selectively actuate said magnetically actuated switches in response to the fuel level in the tank to thereby produce a fuel level responsive voltage at said third probe terminal, (b) a plurality of temperature responsive resistors, each of said temperature responsive resistors being immersed in the fuel and being connected between one of said second probe terminals and the second power supply terminal, (c) a first plurality of scaling resistors, each of said first plurality of scaling resistors being connected to one of said third probe terminals, (d) a fuel weight indicating means including
(i) a first servo amplifier having first and second input terminals and an output terminal,
(ii) first selective conversion means for selectively coupling said first plurality of scaling resistors to the first power supply terminal and to said first input of said first servo amplifier,
(iii) a servomotor connected to said first servo amplifier output terminal,
(iv) first and second potentiometers having first and second slides connected to said first servomotor to be positioned thereby, said potentiometers being connected in parallel across the power supply, said first slide being electrically connected to said second input of said first servo amplifier, and
(v) first readout means connected to said first servomotor for indicating fuel weight, (e) a second plurality of scaling resistors, each of said second plurality of scaling resistors being individually connected to one of said third probe terminals, and (f) a center of gravity position indicating means including
  (i) a second servo amplifier having first and second input terminals and an output terminal,
  (ii) a fixed resistor coupling each of said second plurality of scaling resistors to the first power supply terminal, said first input of said second servo amplifier being connected to the junction of said scaling resistors and fixed resistor,
  (iii) first current producing means connected to said first input terminal of said second servo amplifier for adding a current signal indicative of the aircraft moment without fuel to obtain a total aircraft moment current signal through said fixed resistor,
  (iv) a second servomotor electrically connected to said second servo amplifier output terminal,
  (v) a third potentiometer having a third slide electrically connected to said second input of said second servo amplifier and mechanically connected to said second servomotor to be positioned thereby, said potentiometer being connected to the first power supply terminal,
  (vi) a total fuel weight scaling resistor connecting said third potentiometer to said second slide,
  (vii) a second current producing means connected to said third potentiometer for adding a current signal indicating the weight of the aircraft without fuel,
  (viii) second readout means connected to said second potentiometer for indicating the position of the center of gravity with respect to the fixed datum point.

References Cited

UNITED STATES PATENTS

| | | | |
|---|---|---|---|
| 2,273,850 | 2/1942 | Ewald | 73—313 X |
| 2,541,429 | 2/1951 | Mathes, Jr., et al. | 73—65 |
| 2,751,921 | 6/1956 | Baldwin et al. | 73—65 X |
| 2,758,474 | 8/1956 | McKinney | 73—313 |
| 2,769,338 | 11/1956 | Hermanson | 73—304 C |
| 2,840,097 | 6/1958 | Farkas | 137—98 |
| 2,866,337 | 12/1958 | Minneman et al. | 73—304 C |
| 2,948,146 | 8/1960 | Bergeson | 73—65 |
| 3,200,645 | 8/1965 | Levins | 73—313 |

JAMES J. GILL, Primary Examiner